R. HINKSON & N. P. HINKLEY.
Sod-Cutter.
No. 160,321.   Patented March 2, 1875.
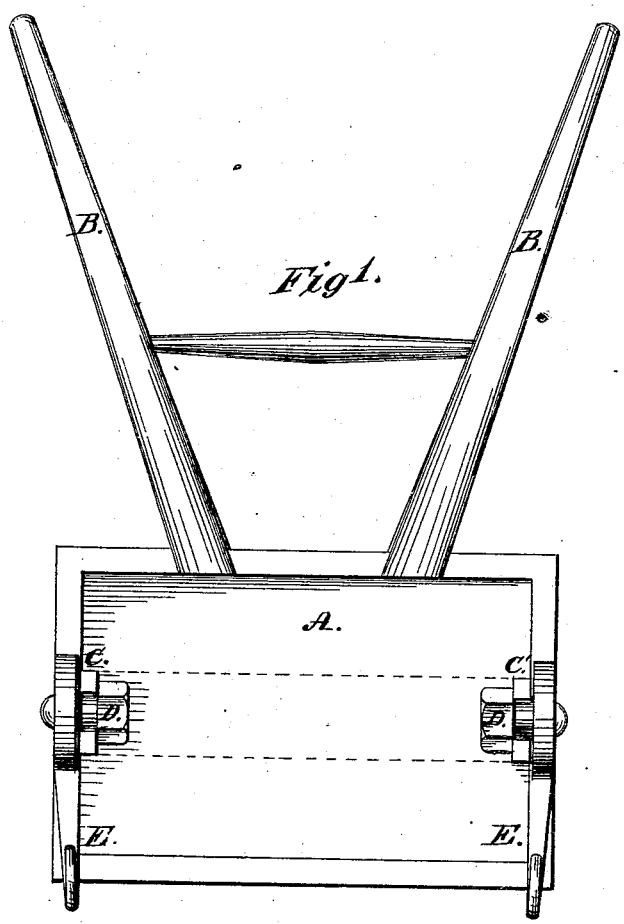
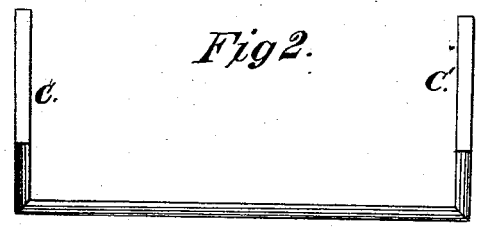
Witnesses:
Charles Bourgeois
Auth. J. Schillo
Inventor:
Ransom Hinkson
Nelson P Hinkley
F. P. Fiker
their attorney

UNITED STATES PATENT OFFICE.

RANSOM HINKSON AND NELSON P. HINKLEY, OF BUFFALO, NEW YORK.

IMPROVEMENT IN SOD-CUTTERS.

Specification forming part of Letters Patent No. 160,321, dated March 2, 1875; application filed July 14, 1874.

*To all whom it may concern:*

Be it known that we, RANSOM HINKSON and NELSON P. HINKLEY, both of the city of Buffalo, in the county of Erie and State of New York, have invented certain new and useful Improvements in Machines for Cutting Sod, of which the following is a specification:

Our invention relates to that kind of machines used for cutting grass sod for lawns or parks; and it consists in the combination of a hollow or box-shaped gage-board, the handles for guiding it, and an adjustable knife for cutting the sod, as will be more clearly hereinafter shown.

In the accompanying drawings, Fig. 1 represents a top view of the machine complete; Fig. 2, a front view of the cutter, which is shown broken to save space. Fig. 3 is a side view of the same.

A is the frame of the machine, which also answers the purpose of a gage-board. It is made in the form of a box, so as to admit of the machine being loaded for the purpose of holding it closely and steady to its work. This enables the operator to adjust it, so as to act equally well in any kind of soil, different soils requiring a different adjustment of the weight to cut the sod to advantage, as will be evident when the varying density of soils is considered. This gage-board or frame is made narrow enough to be easily operated by the handles, either when cutting, entering, or leaving the ground. B B are the said handles, by which the machine is guided in its work. They are made nearly in the form of an ordinary plow-handle. C C' is the cutter, which is shown by dotted lines below the said gage-board A in Fig. 1. It is slotted at each end or side, as shown at D', so as to allow of a vertical adjustment of the same by means of the bolts D D, for the purpose of regulating the thickness of the slices of sod to be cut.

The arrangement is simple and easily understood, the manner of adjustment being plainly evident from the drawings.

E E are the hooks, by which the horses or other power is connected to the machine. The bottom of the gage-board or frame is a plain smooth surface, the front part of which is rounded off upward, so that the machine may be more easily handled when the cutter is entering the ground, and so that it may slide with as much freedom from friction as possible over the ground from which the sod is cut. The cutter C C' is provided with three edges—a horizontal edge for cutting the bottom of the sod, and two vertical edges for cutting the sides of the same.

By means of our invention we believe that we can cut sod with great facility and uniformity in thickness from rough and uneven ground.

What we claim, and desire to secure by Letters Patent, is—

In a sod-cutter, the combination of a hollow or box-shaped gage-board, A, an adjustable cutter, C C', and the handles B B, all arranged for joint operation, substantially in the manner and for the purposes described.

RANSOM HINKSON.
NELSON P. HINKLEY.

Witnesses:
CHAS. BOURGEOIS,
ANTHONY J. SCHILLE.